United States Patent [19]

Lövgren

[11] Patent Number: 5,795,123
[45] Date of Patent: Aug. 18, 1998

[54] METHOD AND A DEVICE FOR TRANSFERRING LOAD UNITS BETWEEN TWO CARRIERS

[76] Inventor: Sten Lövgren, Ösika Tallbackevägen 53, Onsala S-439 33, Sweden

[21] Appl. No.: 765,806

[22] PCT Filed: Jul. 18, 1995

[86] PCT No.: PCT/SE95/00869

§ 371 Date: Jan. 15, 1997

§ 102(e) Date: Jan. 15, 1997

[87] PCT Pub. No.: WO96/02445

PCT Pub. Date: Feb. 1, 1996

[30] Foreign Application Priority Data

Jul. 18, 1994 [SE] Sweden ................. 9402504

[51] Int. Cl.$^6$ ........................................... B60P 1/64
[52] U.S. Cl. .................. 414/343; 414/346; 414/347; 414/495; 414/786
[58] Field of Search ............................ 414/340, 349, 414/343–347, 352, 392, 398, 495, 522, 541, 525.1, 545, 679, 749, 786; 410/82, 83

[56] References Cited

U.S. PATENT DOCUMENTS

| | | | |
|---|---|---|---|
| 1,560,108 | 11/1925 | Simpson | 414/392 |
| 2,004,095 | 6/1935 | Hankins et al. | 414/345 |
| 3,147,868 | 9/1964 | Borger et al. | 414/343 |
| 3,357,582 | 12/1967 | Wittek | 414/347 X |
| 4,051,959 | 10/1977 | Staff et al. | 414/345 |
| 4,089,100 | 5/1978 | Berry, Jr. | 414/495 X |
| 4,728,241 | 3/1988 | Edelhoff et al. | 414/392 |
| 5,421,687 | 6/1995 | Wayman | 414/352 X |
| 5,467,827 | 11/1995 | McLoughlin | 414/495 X |

FOREIGN PATENT DOCUMENTS

| | | | |
|---|---|---|---|
| 49121 | 4/1982 | European Pat. Off. | 414/345 |
| 4208934 | 9/1993 | Germany | 414/343 |
| 309944 | 4/1969 | Sweden | 414/343 |
| 1271774 | 11/1986 | U.S.S.R. | 414/346 |

*Primary Examiner*—David A. Bucci
*Attorney, Agent, or Firm*—Zarley, McKee, Thomte, Voorhees, & Sease

[57] ABSTRACT

The invention is related to a method for transferring load units between two carriers. A first carrier includes a transfer arrangement which is an extendable and retractable arm that moves transverse to the first carrier and forms a path for a carrying member movable along the arm. A second carrier includes elevating securing members which engage a load unit. The method includes the steps of extending the arm from the first carrier so that the arm will be supported by the second carrier, displacing the carrying member along the arm to a position under the load on the second carrier, lowering the load onto the carrying member by lowering the securing members, and transferring the load with the carrying member along the arm to the first carrier.

13 Claims, 5 Drawing Sheets

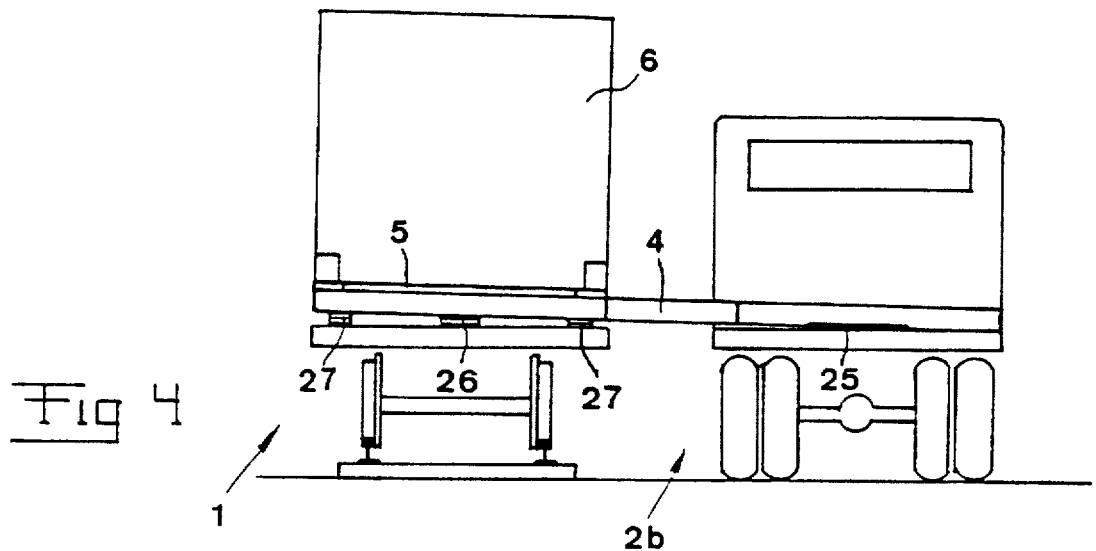
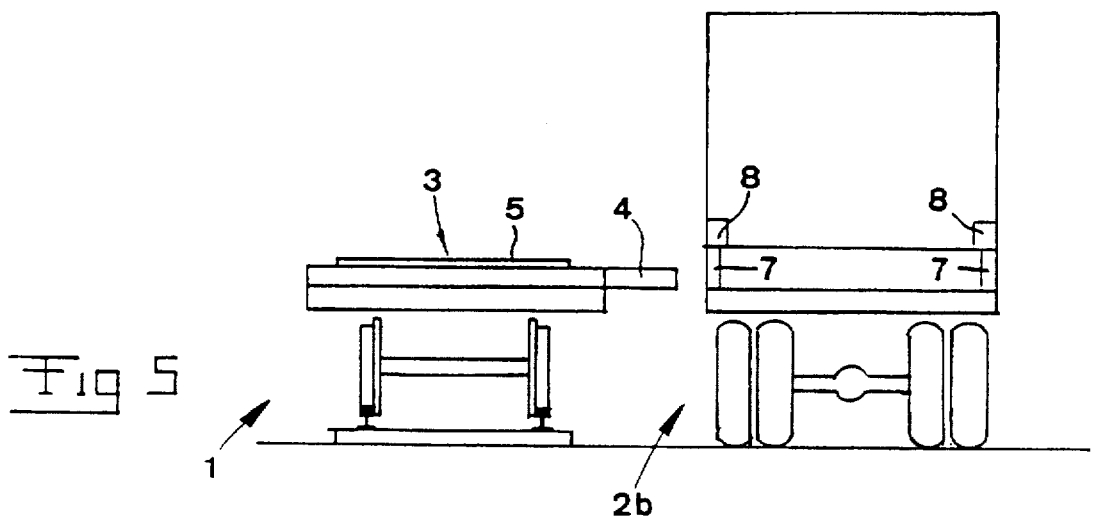

5,795,123

1

METHOD AND A DEVICE FOR TRANSFERRING LOAD UNITS BETWEEN TWO CARRIERS

FIELD OF THE INVENTION AND PRIOR ART

This invention is related to a method for transferring load units between two carriers.

The prior art may roughly be divided into the following categories:

1) According to this first category (for instance EP-A-0 049 121) lifting equipments are arranged on the first carrier for elevating the load unit resting on the second carrier so far that the arm and the carrying member may be pushed in under the load unit, whereupon the latter is moved over to the first carrier by displacement of the carrying member along the arm. The lifting equipments have in practice the character of relatively complicated crane like arrangements based upon only partial lifting of the load unit being carried out by inclining the load unit towards one side. This partial lifting means that the load unit leaves the engagement with the securing members arranged on the second carrier at least as far as some of the securing members is concerned, which jeopardises holding of the load unit on the second carrier. Speaking in general terms, inclination of the load unit in the described manner involves a great danger.

2) According to the second category, the carrying member itself includes lifting members capable of elevating, after introduction of the carrying member under the load unit, the load unit out of contact and engagement with the second carrier such that the load unit then may be transferred to the first carrier. This category involves the disadvantage that it requires a considerable degree of complication of the design of the load carrying structure of the second carrier since the arm, carrying member and the lifting members arranged thereon must be capable of getting under the load unit. More specifically, this requires particular channels or similar recesses in the load carrying structure of the second carrier (see for instance the Swedish patent No. 7613978-1). The need for providing the carrying member itself with lifting members capable of entirely elevating the load unit and maintaining the same elevated during at least parts of the transfer course involves a relatively complicated design of the carrying member and also that the same tends to be rather bulky, at least in vertical direction, a fact which contributes to the complicated load carrying structure and makes its extent in vertical direction rather great, which in its turn involves a reduction of the total load volume on the carrier.

SUMMARY OF THE INVENTION

The object of the present invention is to develop the prior art such that the inconvenience discussed hereinabove are eliminated or at least reduced.

By designing the securing members on the second carrier, and possible also on the first, in this way as vertically moveable, possibilities are created to locate the load unit in an elevated position such that the arm and carrying member may be located under the load unit without necessitating for that purpose complication of the load carrying structure in a degree worth mentioning. Thus, it is no longer necessary to provide the carrying member itself with any lifting members, which on their own are capable of elevating the

2 load unit, but the load unit is applied on the carrying members by lowering the securing members from an upper position to a lower.

Securing members of the kind in question here and conventionally arranged on load vehicles may, in accordance with the invention, relatively easily be replaced by such which are vertically movably arranged in order to be able to operate the load units between upper and lower positions. This means that the load carrying structure for the rest does not have to be subjected to any changes at all, apart from the fact that possible local reinforcements may have to be provided where the transfer arm is intended to rest on the load carrying structure.

Further features and advantages of the solution according to the invention appear from the following detailed description.

BRIEF DESCRIPTION OF THE DRAWINGS

With reference to the enclosed drawings a more specific description of an embodiment of the invention cited as an example follows hereinafter.

In the drawings:

FIGS. 1–5 are diagrammatical views illustrating transfer of a load unit, by means of a transfer arrangement located on a first carrier, from a second carrier to a third carrier;

DETAILED DESCRIPTION OF A PREFERRED EMBODIMENT

Figure 1:
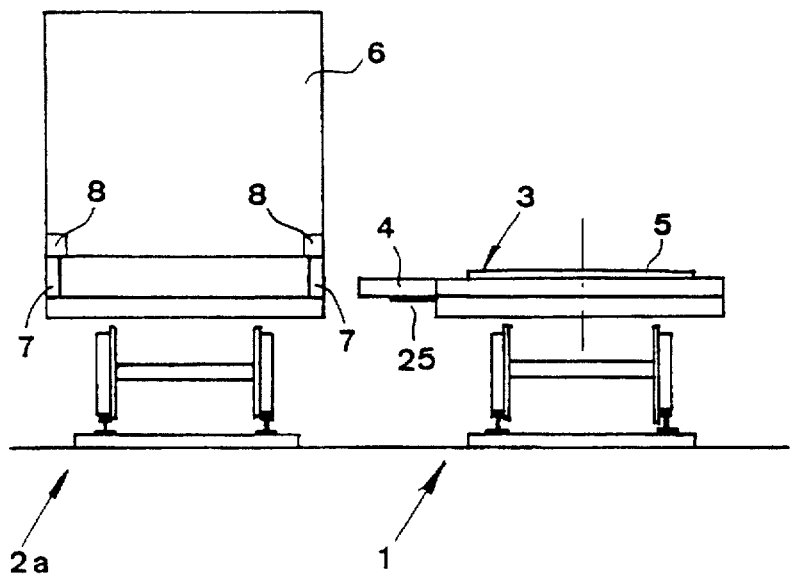

The device according to the invention is intended for transfer of load units between two carriers. These are denoted 1 and 2a or 2b respectively in FIGS. 1–5. A first 1 of the carriers comprises a transfer arrangement 3 including at least one arm 4, which is extendible and retractable respectively in the transverse direction of the carrier 1 and which forms a path of movement for a carrying member 5 included in the transfer arrangement 3, said carrying member 5 being guidedly movable along the arm and adapted to carry the load unit 6 which is intended to be displaced.

In the example the carrier 1 is conceived to have the character of transfer carrier, the object of which is intended to be, primarily, to transfer load units 6 between two different second carriers 2a and 2b. In the example according to FIGS. 1–5 a transfer sequence is illustrated, according to which a load unit 6 is transferred from a second carrier denoted 2a to a second carrier denoted 2b. The second carriers 2a, 2b are in the example illustrated as mobile, i.e. they are designed as vehicles. However, this is not any absolute necessity. Thus, one of the second carriers 2a and 2b could be replaced by a stationary carrying arrangement for receiving and, possibly, storing the load unit 6 in question for a certain time.

In the example the carriers 2a and 2b are illustrated as vehicles of different kinds, the carrier 2a being illustrated as a railway car whereas the carrier 2b is illustrated as a road vehicle, e.g. a truck or a trailer.

The transfer carrier 1 may be formed by a stationary carrying arrangement but is in the preferred embodiment conceived to be designed as a mobile carrier, i.e. as a vehicle. The carrying vehicle 1 may have the character of railway car or a road vehicle. The carrier vehicle 1 could also be formed by a hybrid between these different vehicle types, i.e. it could comprise double sets of wheels, namely one for rail displacement and one for road displacement.

The second carrier 2a, b comprises securing members 7 for securing the load unit 6 in question by engaging with corresponding securing members 8 on the load unit. The securing members 7 have the character of standardised members capable of engaging the corresponding standardised members 8 on the load unit 6 in order to, on one hand, support the same and, on the other hand, secure the load unit 6 against movement in a horizontal plane relative to the carrier 2a, b. In practice, the standardised securing members 7 (see FIG. 10) include, on one hand, support surfaces 9 for supporting the load unit 6 from below, and, on the other hand, engagement members 10 adapted to engage with corresponding engagement members of the securing members 8 of the load unit 6. The securing members 8 comprise, in addition to engagement members for cooperation with the engagement members 10, support surfaces adapted to rest on the support surfaces 9 of the securing members 7 of the carrier 2a, b. In practice, and in the embodiment illustrated, the engagement members 10 of the securing members 7 are formed by upwardly protruding pins adapted to be received in engagement members, which are designed as holes, of the securing members 8 of the load unit 6.

The securing members 8 on the load unit 6 have the character of standardised corner fittings comprising the support surfaces described for abutting against the support surfaces 9 of the securing members 7 and the holes likewise described for receiving the pins 10 of the securing members 7. This is probably most clearly illustrated in FIG. 10.

The minimum criterion as far as the described securing members 7, 8 is concerned is that they, in accordance with the invention should be capable of functioning as vertically supporting and as mutually securing in horizontal direction such that the load unit 6 can not fall off the carrier 2a, b by movement horizontally. However, it is also within the scope of the invention that the securing members 7, 8 may be mutually lockable in the sense that the load unit 6, after such locking, can not be moved upwardly relative to the securing members 7. This is achieved, in accordance with conventional techniques, by the pins 10 comprising lateral projections 11 and being rotatable about vertical axes so that these lateral projections 11 will be located above lock portions contained in the securing members 8 of the load unit 6.

Within this field of the art the securing members 7 are popularly denoted "container locks" whereas the securing members 8 are denoted "container corner fittings". However, this does not mean that the invention should be considered as delimited to application with load units 6 in the form of containers. Instead the load units 6 may have any character at all; they could consist of simple platforms, complex load carrier structures of special design etc.

According to the invention the securing members of the carrier 2a, b are arranged vertically adjustably movable in order to elevate and lower respectively a load unit 6 resting on the securing members 7. For this purpose the securing member 7 may be vertically movably received by a base part 12, which is attached to the chassis of the carrier. A power arrangement 13 diagrammatically indicated in FIG. 10 serves for displacing the securing member 7 upwardly and downwardly relative to the base part 12, which may have the character of a guiding sleeve receiving the securing member 7. As also appears from FIGS. 3, 9 and 10, also the first carrier 1 is intended to comprise securing members 7 of the kind just described. With other words the description given with the assistance of FIG. 10 is applicable not only on the carriers 2a, b but also on the carrier 1 comprising the transfer arrangement 3.

Rotation of the pins 10 of the securing members 7 may occur manually as well as by means of any suitable kind of servo arrangement.

Figure 6:
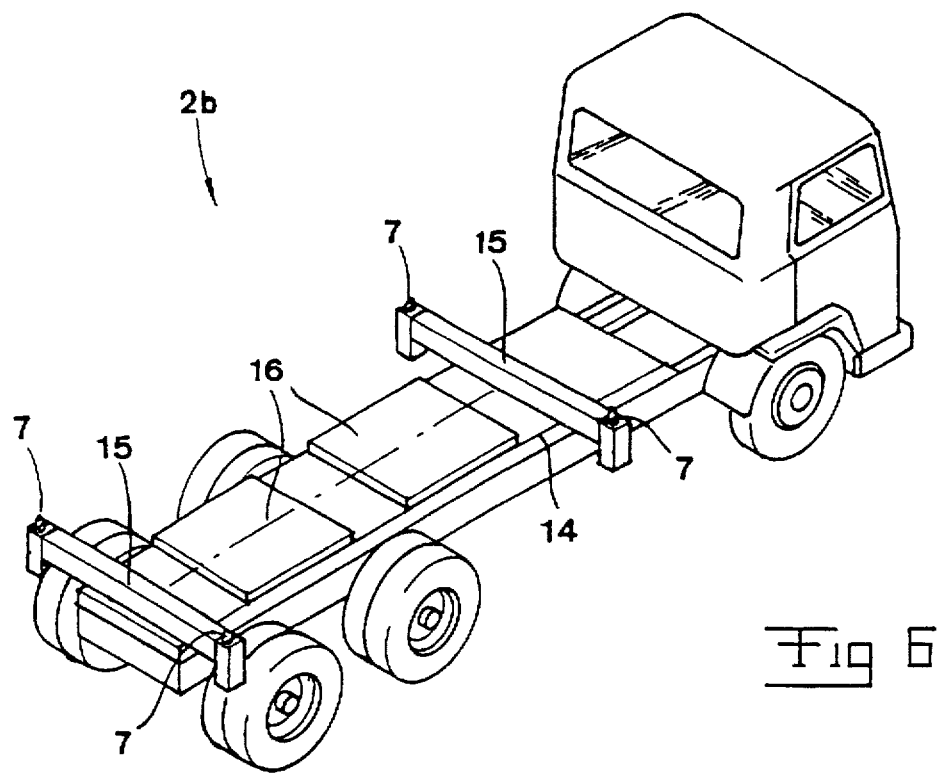
FIG. 6 is a diagrammatical perspective view of a carrier in the form of a road vehicle.

It is illustrated in FIG. 6 that the carrier 2b in the form of a road vehicle comprises, on a chassis 14 designed to be relatively low, container cross beams 15 and securing members 7, which are arranged on said beams and which are of the design just described, namely elevatable. The load carrier structure on the road vehicle 2b comprises, in addition, support surface forming structures 16, forming support surfaces for the extreme ends of two transfer arms 4 disposed in parallel. As also appears from FIG. 9, the transfer carrier 1 is in this case intended to comprise two transfer arms 4. It is, however, pointed out that only one single arm as well as more than two transfer arms may be present. In the case of one single transfer arm, this arm is intended to serve by its own for forming a movement path for the load unit 6 in question. When several transfer arms are present, one or more thereof may be used for an individual load unit.

Figure 7:
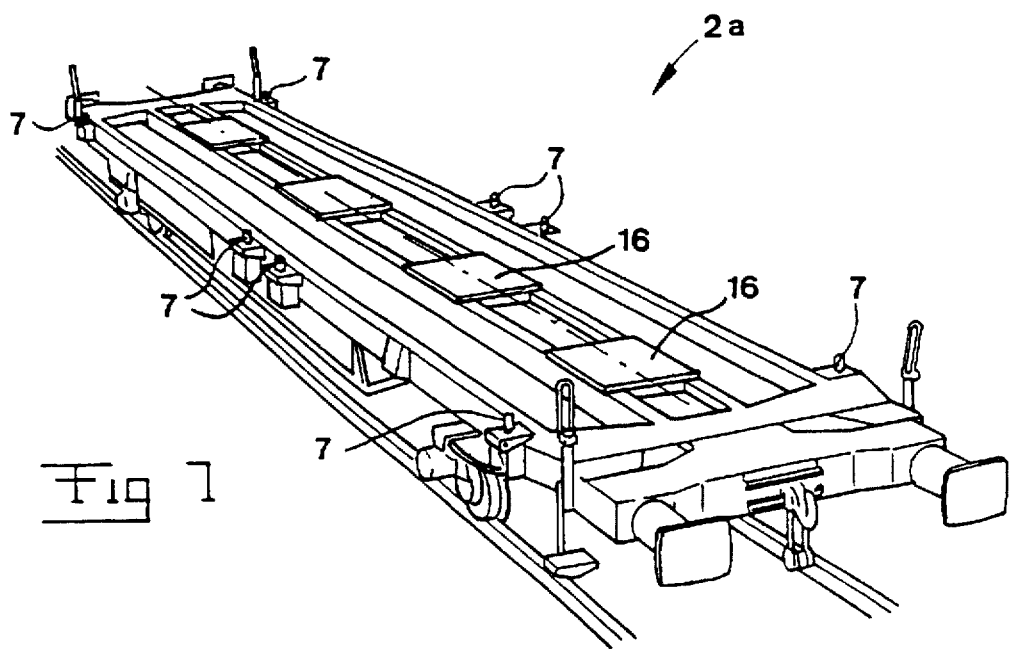
FIG. 7 is a diagrammatical perspective view of a carrier in the form of a railway vehicle.

In FIG. 7 a possible design of a carrier 2a in the form a railway car is illustrated. The carrier comprises eight securing members 7, which, accordingly, are capable of supporting and holding two shorter load units 6. Alternatively, one single long load unit may instead be intended to be support by the railway car, in which case the four securing members 7 placed at the corners of the railway car are used and the securing members 7 placed in the middle region of the car are inactive, e.g. by being retracted downwardly to lower positions, in which they are out of the way for a load unit placed on the other securing members. Similar to what has just been described for the road vehicle according to FIG. 6, also the railway car comprises support surfaces forming structures 16 placed along the longitudinal centre plane of the car for centrical load support.

Figure 8:
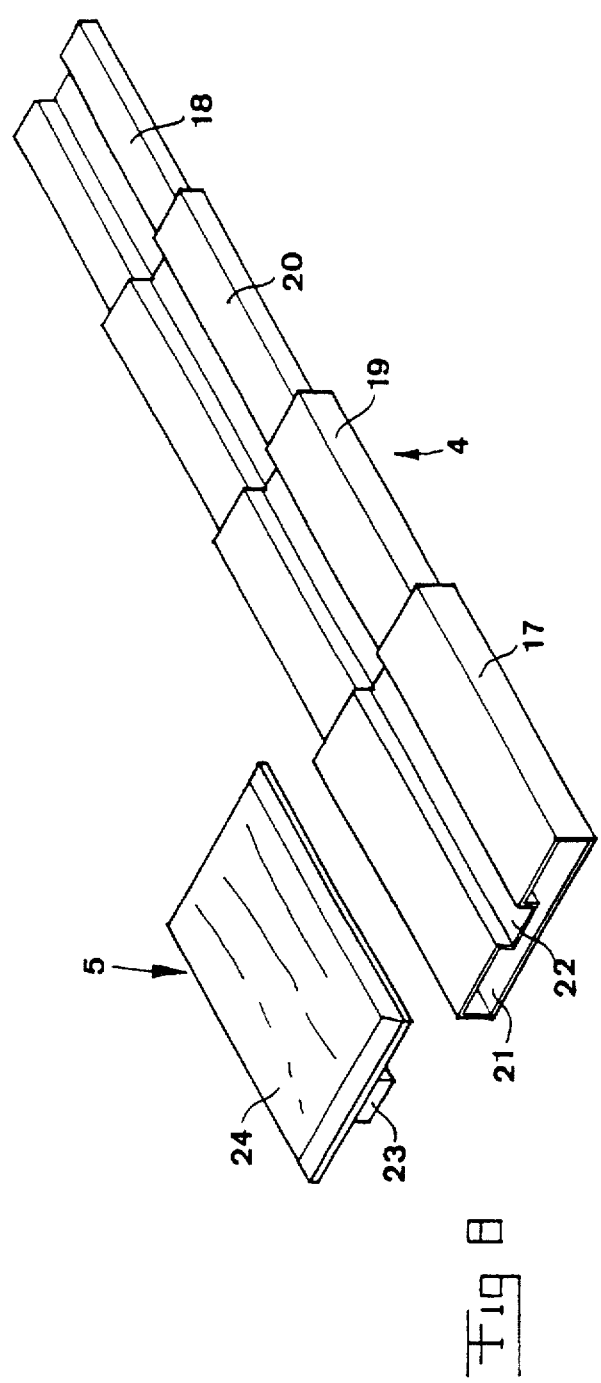
FIG. 8 is a perspective view of the transfer arm and the carrying member movable therealong.

In FIG. 8 it is illustrated that the extensioning and retracting respectively of the transfer arm 4 is intended to be realised by means of a telescoping design of the arm. In the example the arm comprises four mutually movable parts, namely a base part 17, a extreme part 18 and two intermediate parts 19, 20. In order to expand and contract the arm 4, an arbitrary power arrangement may be in question: a system of piston cylinder mechanisms may for instance be used. Other alternatives are chain or gear rack driving devices of a kind known per se. An essential feature of the arm 4 is, however, that it should be capable of being expanded and contracted respectively transversely relative to the carrier 1 in opposite directions in order to enable transfer of load units transversely to the carrier 1 in both directions. It appears from FIG. 8 that the base part 17 of the arm 4 is open at 21 also at the side located most closely to the viewer so that the telescope parts 18–20 may project in opposite direction compared to that illustrated in FIG. 8.

In FIG. 8 also the carrying member 5 is illustrated, which has the character of a slide displaceably movable along the arm 4. In order to contribute to or carry out displacement of the carrying member 5 along the arm 4, the carrying member may comprise a suitable driving arrangement. As an example it may be mentioned that the carrying member 5 could comprise wheels drivingly rolling against the surfaces of the arm 4. The wheel or wheels in question could possibly be formed by a gear wheel, in which case this would cooperate with a gear track arranged on the arm 4, said gear track comprising gear sections on the various telescope parts of the arm 4. It would also be possible to displace the carrying member 5 along the arm 4 by means of a suitable wire system; also the telescope parts 18–20 of the arm 4 could be operated by means of a wire system.

The carrying member 5 and the arm 4 comprise mutually engaging guide members for guiding the carrying member 5 in its movement along the arm 4. These guide members may for instance have the character of engaging projections/recesses. In the example in FIG. 8 it is illustrated that the arm 4 has a longitudinal recess 22, in which a projection 23 arranged on the carrying member 5 is intended to run in a guided manner.

The carrying member 5 has on its upper side a load equalising arrangement 24 for contacting the load unit 6 from below. The arrangement 24 may for instance be designed as a cushion or bellows, which is intended to be, when contact with the load unit is to be established, expanded by means of a suitable pressure fluid such that the upper surface of the arrangement 24 may adjust to the lower surface of the load unit.

Figure 2:
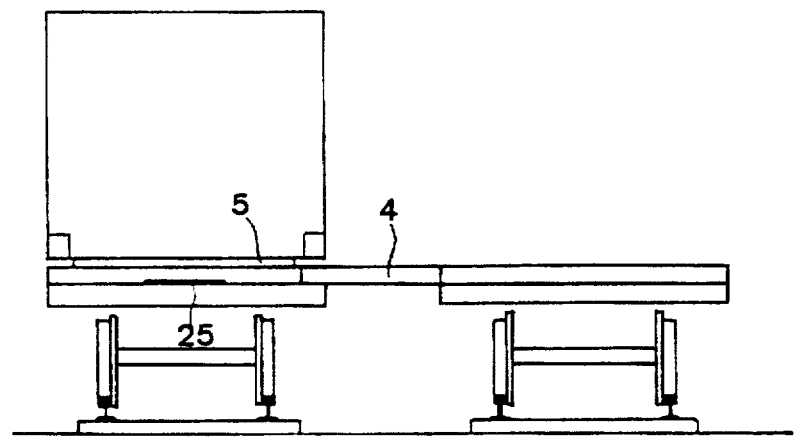

As is indicated in FIGS. 1, 2 and 4, the arm 4 is intended to comprise, at its extreme end, means 25 for abutting against the carrier 2a, b, more specifically against the support surfaces 16 arranged thereon. This means 25 may have the purpose to achieve a lenient supporting contact between the arm 4 and the respective carriers 2a, b. The means 25 may, however, also be of a more refined nature and be capable of adjusting the vertical position of the extreme end of the arm 4 relative to the carrier 2a, 2b. The means 25 could for instance comprise one or more expandable load transferring members, for instance in the form of cushions or bellows, to which pressure fluid may be supplied so as to obtain expansion. Such cushions or bellows have the advantage that they may intimately adapt themselves to the surface conditions present.

Furthermore, the carrier 1 comprises, for instance, means 26, 27 diagrammatically indicated in FIGS. 4 and 10 for adjusting a vertical position of the arm 4, more specifically the base part 17 thereof, relative to the carrier 1. These means 26, 27 comprise one or more expandable force developing members. It is preferred that the ability of expansion of these members is caused by a pressure fluid supply but also other designs are possible. In the case of pressure fluid members, it is possible to design the expandable members as cushions or bellows.

It is preferred that the arm 4 comprises means for allowing adjustment thereof into an inclined position (see for instance FIG. 4) for the purpose of establishing a downwardly progressing path of movement simplifying displacement of the load unit so that gravity contributes with a force component obtaining displacement of the carrying member 5 and the load unit 6 along the arm 4.

The means for allowing the inclined adjustment of the arm are suitable formed by the previously described adjustment means 25–27. The means 27 located adjacent to the sides of the carrier 2a, b could in that connection be arranged to define the inclination of the arm 4 whereas the central means 26 located on the carrier primarily carried out the vertical adjustment per se of the arm 4.

The first carrier 1 comprising the transfer arrangement 3 has a body 28 (see FIGS. 9 and 10) which here is designed as a vehicle chassis. Besides the carrier 1 comprises a frame 29 adjustable relative to the body 28, the securing members 7 and said at least one arm 4 being arranged on said frame. The frame 29 is adjustable in a substantially horizontal direction along the carrier 1 by means of power members 30. The object of this adjustability is to enable fine adjustment of the securing members 7 and the transfer arrangement 3 relative to a second carrier 2a, b standing at the side of the carrier 1. In the example the mobility of the frame 29 along the body 28 is realised in that a part 31 contained in the frame 29 is guidedly moveable along the body 28. As can be seen from FIG. 9, the power member 30 may for instance be realised in the form of a piston cylinder mechanism.

Besides, it is preferred that the frame 29 is adjustable vertically relative to the ground and, accordingly, relative to the body 28 by means of power members 32 so that a vertical position suitable for transfer of a load unit may be adjusted. The power members 32 act, suitably, between vertically mutually movable parts of the frame 29.

An important circumstance to note is that the transfer arm 4 is of a rigid load carrying construction in the vertical plane so that it may function as a self supporting bridge between support points located centrally on the respective carrier 1, 2a, b.

Figure 3:
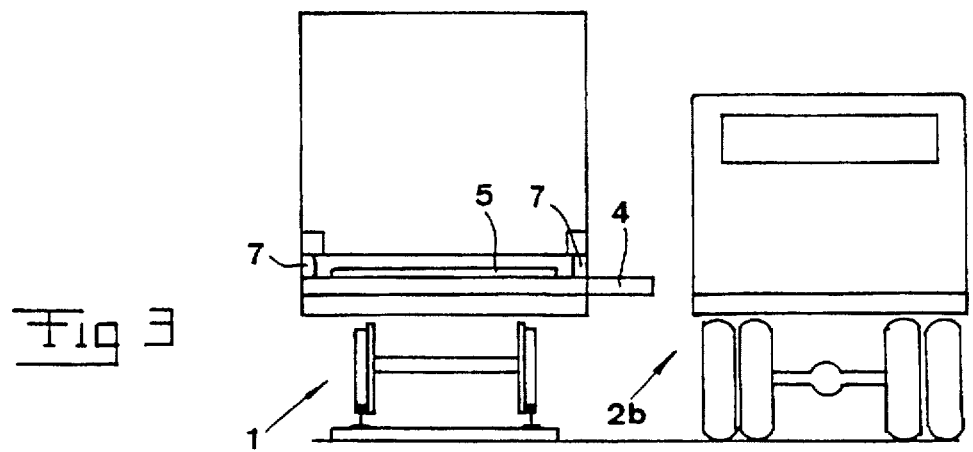

The device described operates in the following manner:

It is illustrated in FIG. 1 how a load unit 6 is intended to be transferred from the carrier 2a to the carrier 1. For this purpose the load unit 6 is initially elevated by means of the securing members 7 to such an elevated position that the arm 4 may be expanded in under the load unit 6 and be located with its support means 25 in the middle of the carrier 2a on its support surfaces 16. The carrying members 5 are next displaced from their positions on the carrier 1 along the arms 4 to a position under the load unit 6. Thereafter the securing members 7 are lowered such that the load unit 6 is lowered down onto the carrying members 5 and entirely disengaged from the load unit 6. The carrying members 5 with the load unit carried thereby is then displaced along the arms 4 until the load unit is located above the carrier 1. The arms 4 are then retracted to the carrier 1. If so desired, i.e. if the loud unit 6 is to remain on the carrier 1 during a certain time period, the securing members 7 of the carrier are elevated so that the load unit is lifted up to a level above the carrying members 5. This means that the carrying members 5 will be relieved from load as indicated in FIG. 3. When the load unit 6 then is to be transferred to the carrier 2b illustrated in FIGS. 3–5, the transfer arms 4 are initially moved over to the carrier 2b as indicated in FIG. 4. The securing members 7 on the carrier 1 are then lowered such that the load unit will rest on the carrying members 5, which thereafter are displaced along the arms 4 to a position above the carrier 2b. The loud unit 6 is then elevated on the carrier 2b by means of the securing members 7 as is indicated to the right in FIG. 5 and the transfer arms 4 and the carrying members 5 may then be retracted to their positions on the carrier 1.

Figure 9:
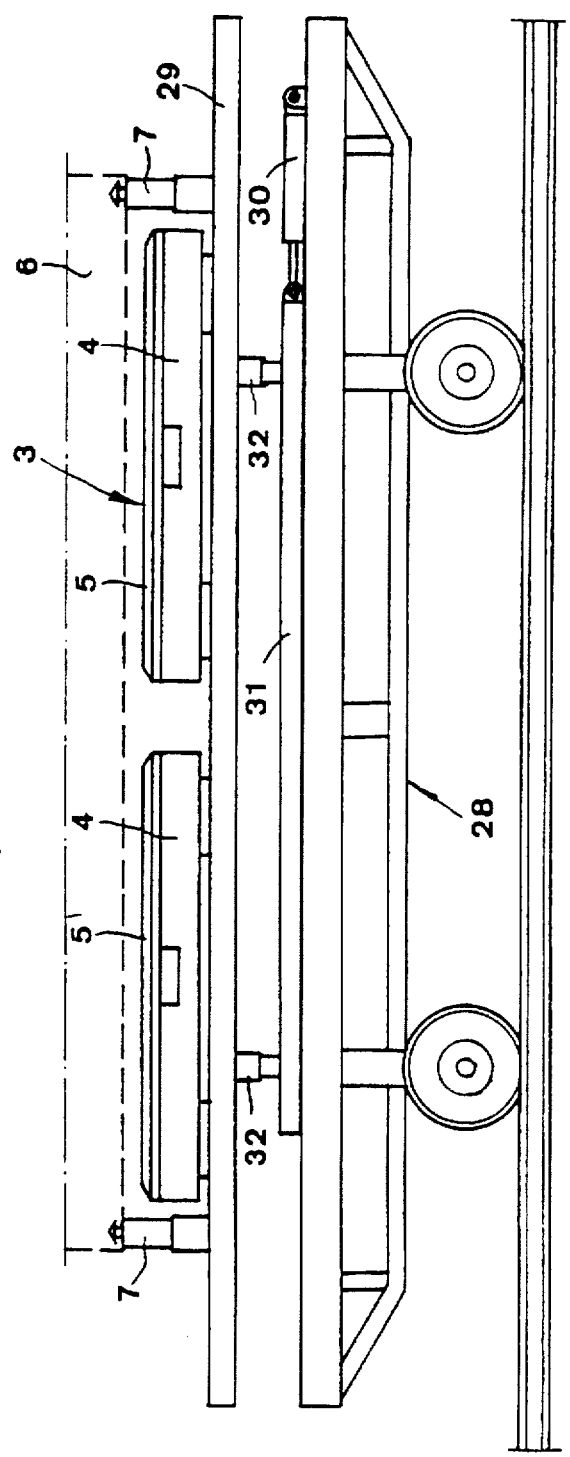
FIG. 9 is a side view of the carrier and its transfer arrangement.
Figure 10:
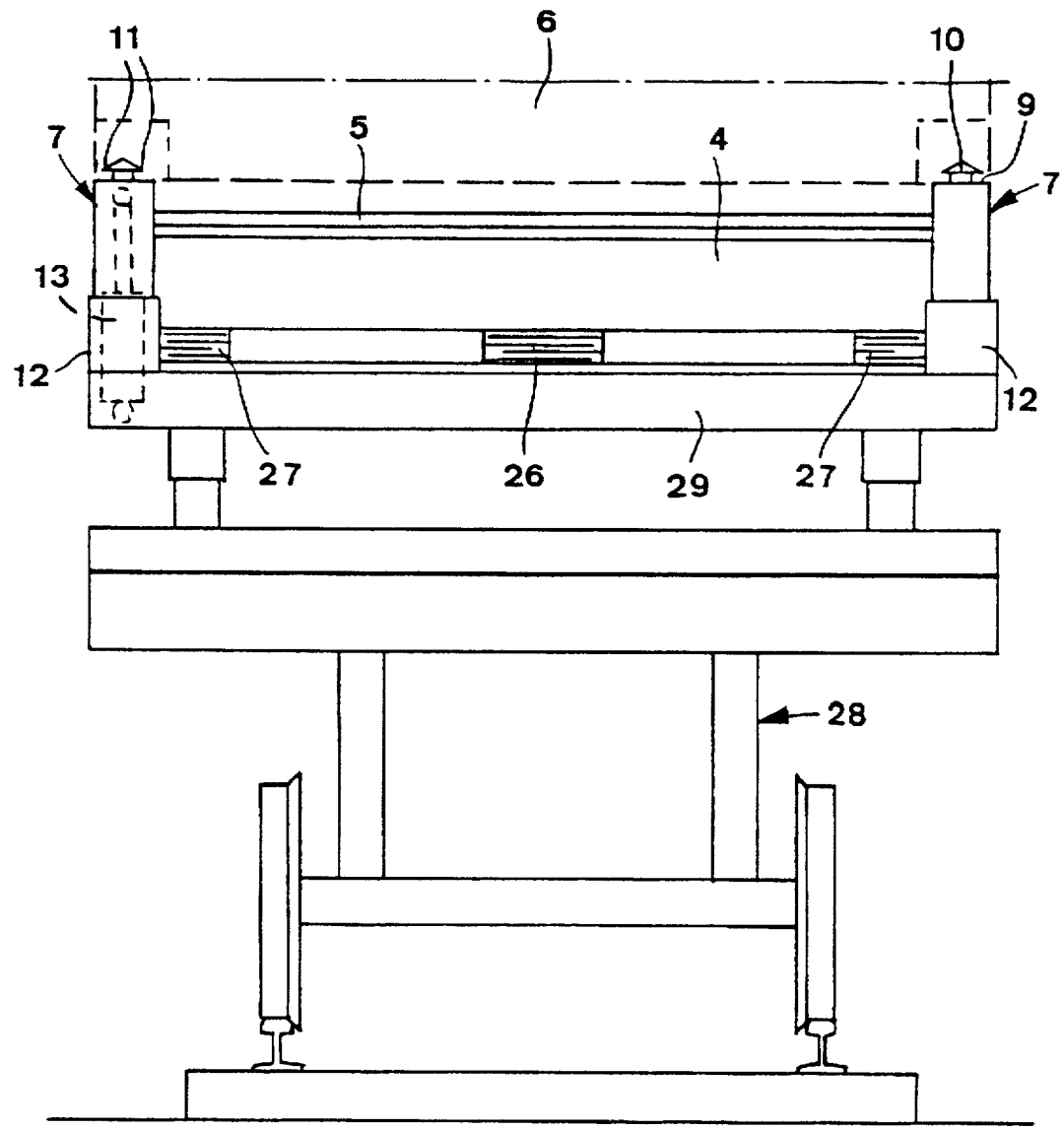
FIG. 10 is a view of the first carrier according to FIG. 9 viewed from the left end.

It is of course a circumstance to consider in the transfer sequences mentioned above that the carriers 1 and 2a, b respectively are located substantially parallel to each other and also with an adequate relative position in longitudinal direction, which position is possible to adjust by means of the longitudinally moveable frame 29 on the carrier 1 (see FIG. 9). Furthermore, the transfer arms 4 may comprise suitable sensing devices controlling the amount of extensioning of the transfer arms 4 such that the extreme ends of the arms will apply the load of the arms on the carriers 2a and 2b respectively in the area of their longitudinal central lines. An adequate mutual vertical position for transfer may be adjusted by means of the power member 32 in FIG. 9, which execute adjustments vertically of the transfer arrangement 3 and the securing members 7 on the carrier 1. Finally, the transfer arms 4 may also, as is illustrated in FIG. 4, be adjusted so that they form a sloping path of movement with assistance of the means 25, 26 and/or 27. The corresponding slope may for the rest be used in the transfer illustrated in FIG. 2, i.e. that the transfer arms 4 could form a path of movement sloping from the carrier 2a in a direction towards the carrier 1.

The invention is of course not only restricted to the device described above for exemplifying purpose. Thus, the device may be subjected to numerous modifications without deviating from the concept of the invention.

I claim:

1. A method for transferring load units (6) between two carriers, a first (1) of said carriers comprising a transfer arrangement (3) including at least one arm (4), which is extendible and retractable respectively in a transverse direction relative to the first carrier and which forms a path of movement for a carrying member (5) included in the transfer arrangement, said carrying member being guidable moveable along the arm and adapted to carry the load unit which is displaced, a second (2a, 2b) of the carriers comprising securing members (7) for securing the load unit in question by engaging with corresponding securing members (8) on the load unit, said method comprising, on transfer of a load unit (6) from the second carrier (2a, b) to the first carrier, extensioning of the arm from the first carrier (1) so that the arm (4) will be supported by the second carrier, displacement of the carrying member (5) along the arm (4) to a position under the load unit on the second carrier, establishment of a carrying relation between the carrying member (5) and the load unit (6) and displacement of the carrying member with a load unit carried thereon from the second carrier to the first, characterized in that establishment of carrying relation between the carrying member (5) and the load unit (6) is obtained by lowering the load unit from an elevated position down onto the carrying member by lowering the securing members (7), which are arranged to be vertically movable, of the first carrier from an elevated position.

2. A method according to claim 1, wherein the load unit (6), when it is located on the first carrier (1) is elevated for relieving the carrying member from load by elevating securing members (7) arranged on the first carrier so as to secure the load unit by engaging with the corresponding securing members (8) on the load unit.

3. A method according to claim 1 wherein the method comprises, upon transfer of the load unit (6) from the first carrier (1) to the second carrier (2a, b), extensioning of the arm (4) from the first carrier so that the arm will be supported by the second carrier, displacement of the carrying member (5) as well as the load unit supported thereby along the arm until the carrying member and the load unit are located in a position above the second carrier (2a, b), elevation of the securing members arranged on the second carrier so that the load unit is elevated from the carrying member (5) returning of the carrying member along the arm to a position above the first carrier, retraction of the arm to the first carrier and lowering of the securing members of the second carrier so that the load unit is placed in a normal transport position on the second carrier.

4. A method according to claim 1, wherein the arm (4) is adjusted in an inclined position between the first carrier and the second carrier in order to enable establishment of a downwardly sloping path of movement for the carrying member and a load unit carried thereby during transfer to the first carrier from the second carrier and/or during transfer from the first carrier to the second carrier.

5. A device for transferring load units (6) between two carriers, a first (1) of said carriers comprising a transfer arrangement (3) including at least one arm (4) which is extendible and retractable respectively in a transverse direction relative to the first carrier and which forms a path of movement for a carrying member (5) included in the transfer arrangement, said carrying member (5) being guidedly moveable along the arm and adapted to carry the load unit which is displaced, whereas the second (2a, b) of the carriers comprise securing members (7) for securing the load unit in question by engaging with corresponding securing members (8) on the load unit, characterized in that the securing members (7) of the second carrier (2a, b) are arranged to be adjustably moveable vertically in order to elevate and lower respectively a load unit resting on the securing members and that the vertical adjustability of the securing members is adapted to the transfer arrangement (3) such that a load unit resting on the securing members may be lowered, from an elevated position, such that the load of the load unit is transferred from the securing members to the carrying member introduced under the load unit and the load unit may be displaced transversely by means of the carrying member away from the second carrier without hindrance from the securing members, the securing members being arranged to be able to take over, on elevation thereof, the load of a load unit resting on the carrying member by engaging with the securing members of the load unit and elevating the load unit so that a carrying member is displaceable away from the position under the load unit along the arm.

6. A device according to claim 5, wherein the first carrier (1) comprises elevatable securing members (7) for securing the load unit by engaging with the corresponding securing members (8) on the load unit, whereby the carrying member may be relieved from the load unit by elevating the securing members.

7. A device according to any of claim 5, wherein the arm (4) comprises means (25–27) for allowing adjustment of the arm in an inclined position.

8. A device according to claim 5, wherein the first carrier comprises means (25–27) for adjusting the vertical position of the arm (4) relative to the carrier.

9. A device according to claim 5, wherein the arm (4) comprises, at a remote end thereof, means (25) for adjusting the vertical position of the remote end of the arm relative to the second carrier.

10. A device according to claim 5, wherein the carrying member (5) has a load equalising arrangement (24), e.g. in the form of a cushion or bellows, for contacting the load unit (6).

11. A device according to claim 5, wherein the first carrier (1) comprises a body (28) and a frame (29), which is adjustable in a substantially horizontal direction along the first carrier relative to the body by means of power members (30), the securing members (7) and said at least one arm (4) being arranged on said frame.

12. A device according to claim 5, wherein the first and second carriers are designed as vehicles.

13. A device according to claim 5, wherein the arm (4) is extendible transversely relative to the first carrier in opposite directions in order to enable transfer of the load unit transversely of the first carrier in both directions.

* * * * *